United States Patent
Aoki

(10) Patent No.: US 8,072,964 B2
(45) Date of Patent: Dec. 6, 2011

(54) COMMUNICATION APPARATUS FOR CONNECTING TO ANOTHER APPARATUS IN ACCORDANCE WITH OCCUPANCY OF BEACON SLOTS AND COMMUNICATION METHOD FOR THE SAME

(75) Inventor: Norihito Aoki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 599 days.

(21) Appl. No.: 12/212,035

(22) Filed: Sep. 17, 2008

(65) Prior Publication Data

US 2009/0092123 A1    Apr. 9, 2009

(30) Foreign Application Priority Data

Oct. 3, 2007   (JP) .................. 2007-260354

(51) Int. Cl.
*H04J 3/06*   (2006.01)

(52) U.S. Cl. .............. 370/350; 370/345; 370/459

(58) Field of Classification Search .............. 370/310, 370/345, 350, 431, 458, 459
See application file for complete search history.

(56) References Cited

U.S. PATENT DOCUMENTS

| | | |
|---|---|---|
| 6,894,992 B1 | 5/2005 | Morvan et al. |
| 2007/0274206 A1 * | 11/2007 | Habetha et al. ............. 370/222 |
| 2008/0071936 A1 * | 3/2008 | Sugaya ........................ 710/12 |
| 2008/0253354 A1 * | 10/2008 | Eguchi ........................ 370/350 |

* cited by examiner

*Primary Examiner* — Chi Pham
*Assistant Examiner* — Weibin Huang
(74) *Attorney, Agent, or Firm* — Cowan, Liebowitz & Latman, P.C.

(57) ABSTRACT

In a communication system in which a plurality of communication apparatuses form a wireless network and communicate with each other, a communication apparatus establishes timing synchronization by transmitting and receiving a beacon to and from other communication apparatuses. The communication apparatus determines whether or not beacon slots for transmitting the beacon are occupied, and if the beacon slots are occupied, connects to another communication apparatus without transmitting the beacon.

8 Claims, 14 Drawing Sheets

COMMUNICATION APPARATUS FOR CONNECTING TO ANOTHER APPARATUS IN ACCORDANCE WITH OCCUPANCY OF BEACON SLOTS AND COMMUNICATION METHOD FOR THE SAME

BACKGROUND OF THE INVENTION

1. Field of the Invention

The present invention relates to a communication technique in a communication system.

2. Description of the Related Art

In the WUSB 1.0 standard, a host and devices form a WUSB cluster and communicate using TDMA-based superframes (for example, see Wireless Universal Serial Bus Specification, Revision 1.0). WUSB is an abbreviation for Wireless Universal Serial Bus, and TDMA is an abbreviation for Time Division Multiple Access.

A superframe consists of 256 Media Access Slots (MASs) of 256 µs each, with the first 16 MASs being used as a BP (Beacon Period) to transmit beacons. Three beacon slots are assigned to one MAS and therefore 48 beacon slots exist in the 16 MASs, while beacon slot number 0 and number 1 cannot be used for band reservation because they are used for BP relocation.

The remaining duration of the superframe other than the BP is used as DRPs (Distributed Reservation Periods), each of which is a band in which communication is possible within a cluster. The duration of a DRP is indicated by a DRP IE (DRP Information Element) in a beacon transmitted from the host or a device.

The number of a beacon slot for transmitting a beacon is determined by negotiation among the devices. A device also uses a BPO IE (Beacon Period Occupancy IE) in the beacon in order to communicate the numbers of the beacon slots used by neighboring devices from the device to devices existing as hidden terminals.

Synchronization among the hosts and devices is managed in an autonomous-decentralized manner, and the hosts have a function of managing superframe synchronization adjustment. A host or a device performs the superframe synchronization adjustment by receiving beacons of other devices.

The devices are broadly divided into: SBDs having a function of managing the superframe synchronization adjustment by themselves; DBDs not having the function of managing the superframe synchronization adjustment by themselves; and NBDs not managing the synchronization and not transmitting or receiving beacons for further reduction in power consumption. SBD is an abbreviation for Self-Beaconing Device, DBD for Directed Beaconing Device, and NBD for Non Beaconing Device.

Now, the frame structure at the MAC (Media Access Control) layer used by the WUSB 1.0 standard will be described with reference to FIG. 1.

This standard uses the ECMA-368 standard for the MAC layer. The communication time is managed based on a frame called a superframe 300, and one superframe has a duration of 65536 µs (for example, see Standard ECMA-368 High Rate Ultra Wideband PHY and MAC Standard). The first 16 MASs in the superframe are dedicated as a BP 400, and WUSB hosts and SBDs transmit a beacon in the BP 400 to reserve a band in the superframe as a DRP. The start point of the superframe, that is, the start point of the BP 400, is called a BPST (Beacon Period Start Time). A beacon 410 consists of a beacon group parameter 4110, a DRP IE 4120, a BPO IE 4130, and other IEs (Information Elements) 4140.

A device transmitting a beacon announces in the DRP IE 4120 the position of MASs of reserved bands, and announces in the BPO IE 4130 the beacon slot used by the device, the beacon slot numbers of neighboring devices, and the BP length.

Now, the relationship between a WUSB channel and the MAC layer will be described with reference to FIG. 2. Each DRP (420, 430, 440, 450, 460, 470) in FIG. 2 is a reserved period of a communication band in a certain WUSB cluster. In each DRP, a WUSB host broadcasts MMCs (Micro-scheduled Management Commands) that control the data input/output direction and so on. An MMC consists of a header and IEs.

The section from an MMC to the next MMC is called a TG (Transaction Group); for example, the TG for an MMC 443 is a TG 444. Described in the MMC 443 are the communication band in the direction from the WUSB host to the WUSB devices, the communication band in the direction from the WUSB devices to the WUSB host, and so on.

If a WUSB host has an SBD in the WUSB cluster, the management of the superframe synchronization adjustment with a neighboring device is performed by analyzing a packet that can be received around the SBD via the SBD and by moving the position of the BPST.

During the BP period, the SBD not only transmits a beacon by itself but also receives beacons from other devices in other beacon slots and analyzes which beacon slots are available by referring to the BPO IE.

However, there has been the following problem; if the BP reaches the maximum length and the beacon slots that the BP can accommodate are occupied, the SBD cannot transmit a beacon at startup and cannot connect to the WUSB host.

SUMMARY OF THE INVENTION

An object of the present invention is to operate according to the state of occupancy of beacon slots during the period in which timing synchronization is established by transmitting and receiving beacons, and thereby to efficiently connect to another communication apparatus.

According to an aspect of the present invention, there is provided a communication apparatus comprising: a synchronization unit that is synchronized with other communication apparatuses by transmitting and receiving a beacon to and from each other; a determination unit that determines whether or not beacon slots for transmitting the beacon by the synchronization unit are occupied; and a connection unit that connects to another communication apparatus without transmitting the beacon depending on the determination of the determination unit.

According to another aspect of the present invention, there is provided a communication method for a communication apparatus that can be synchronized with other communication apparatuses by transmitting and receiving a beacon to and from each other, comprising: determining whether or not beacon slots for transmitting the beacon are occupied; and connecting to another communication apparatus without transmitting the beacon depending on the determination.

Further features of the present invention will become apparent from the following description of exemplary embodiments (with reference to the attached drawings).

DESCRIPTION OF THE EMBODIMENTS

The best mode for implementing the present invention will be described in detail below with reference to the drawings.

First Embodiment

The configuration of a communication apparatus in a first embodiment will be described with reference to FIG. 3. The communication apparatus may be implemented as a single communication device or may be implemented with additional functions as necessary. The configuration of this communication apparatus applies to a WUSB host and a WUSB device.

Figure 1:
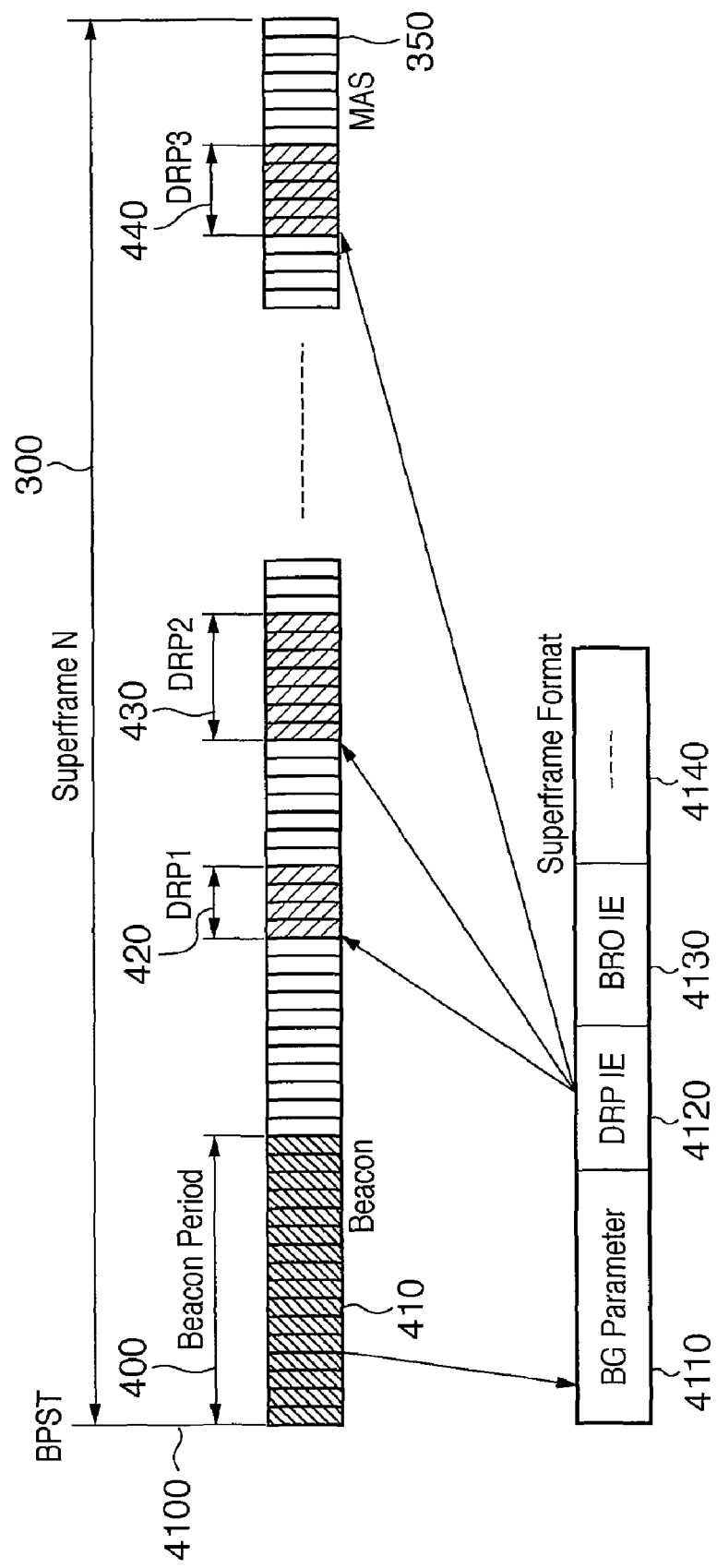
FIG. 1 is a diagram showing the frame structure at the MAC (Media Access Control) layer used by the WUSB 1.0 standard.
Figure 2:
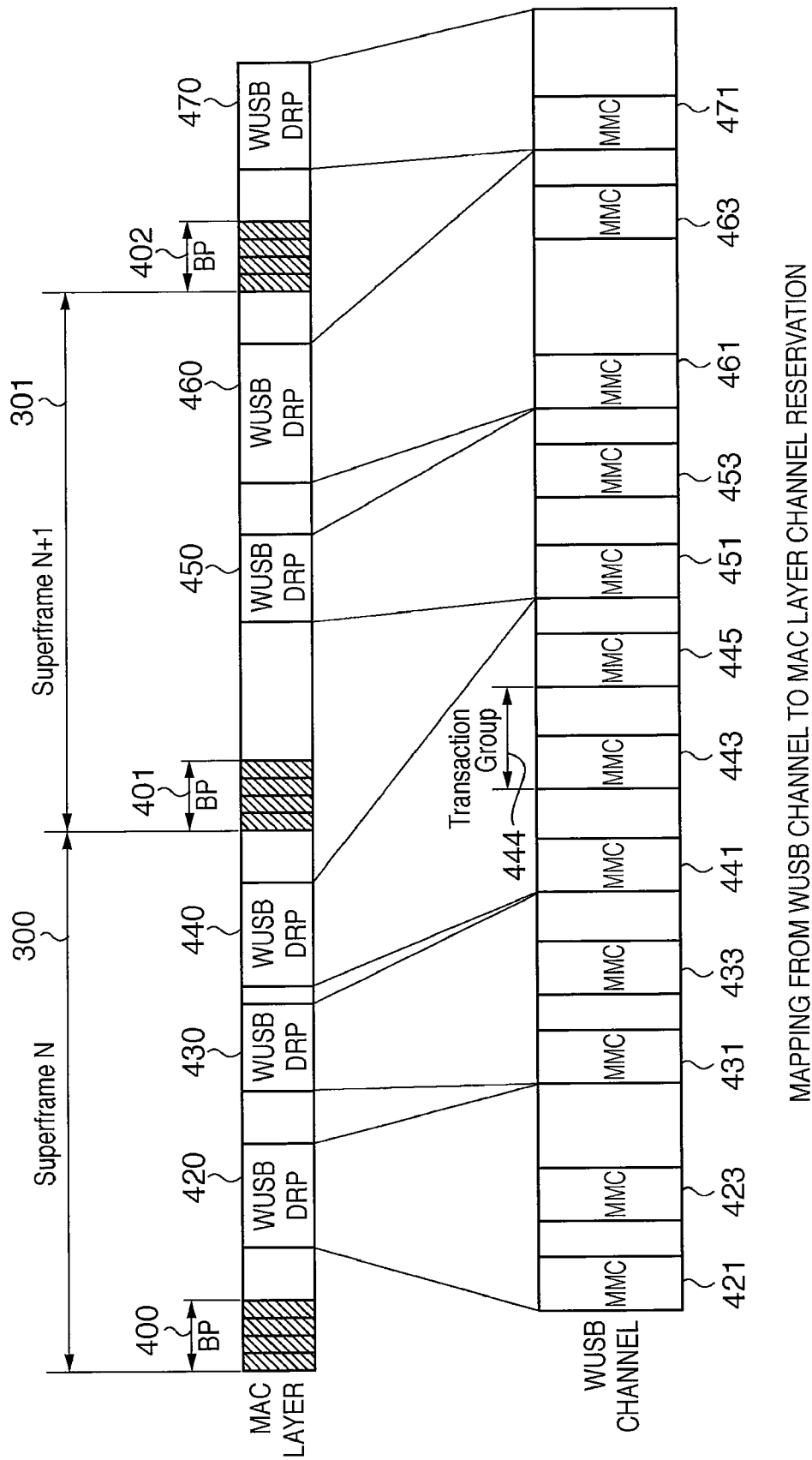
FIG. 2 is a diagram for describing the relationship between a WUSB channel and the MAC layer.
Figure 3:
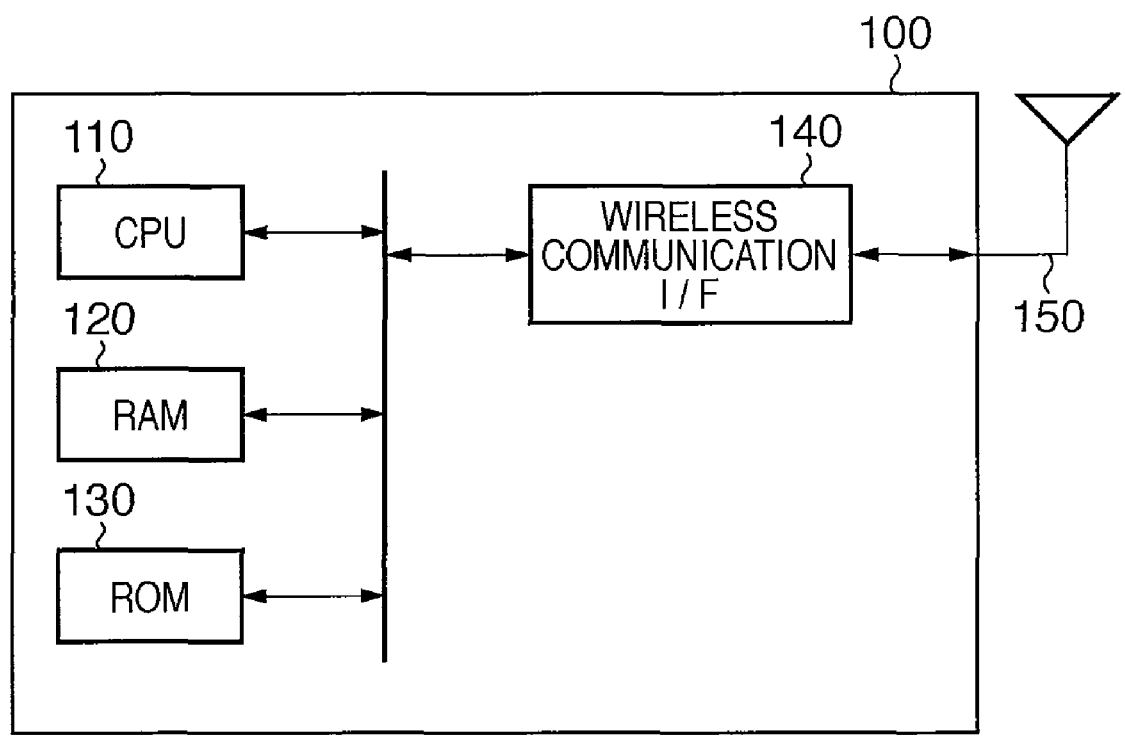
FIG. 3 is a block diagram showing an exemplary configuration of a communication apparatus in a first embodiment.

FIG. 3 is a block diagram showing an exemplary configuration of the communication apparatus in the first embodiment. As shown in FIG. 3, the communication apparatus 100 basically includes a CPU 110 that controls the entire communication apparatus, a RAM 120 that temporarily stores programs and data supplied from an external apparatus and so on, and a ROM 130 that stores a control program for the CPU 110 and various parameters and so on. The communication apparatus 100 further includes a wireless communication interface 140 and an antenna 150 that implement a wireless communication function. The communication apparatus 100 may be implemented in the above configuration or may be implemented with additional functions as necessary, such as a storage device and a display device.

Here, the communication apparatus 100 has a function such that a plurality of communication apparatuses establishes timing synchronization by transmitting a beacon to each other. The procedure of this timing synchronization establishment will be described with reference to a system configuration diagram shown in FIG. 4 and a timing chart shown in FIG. 5.

Figure 4:
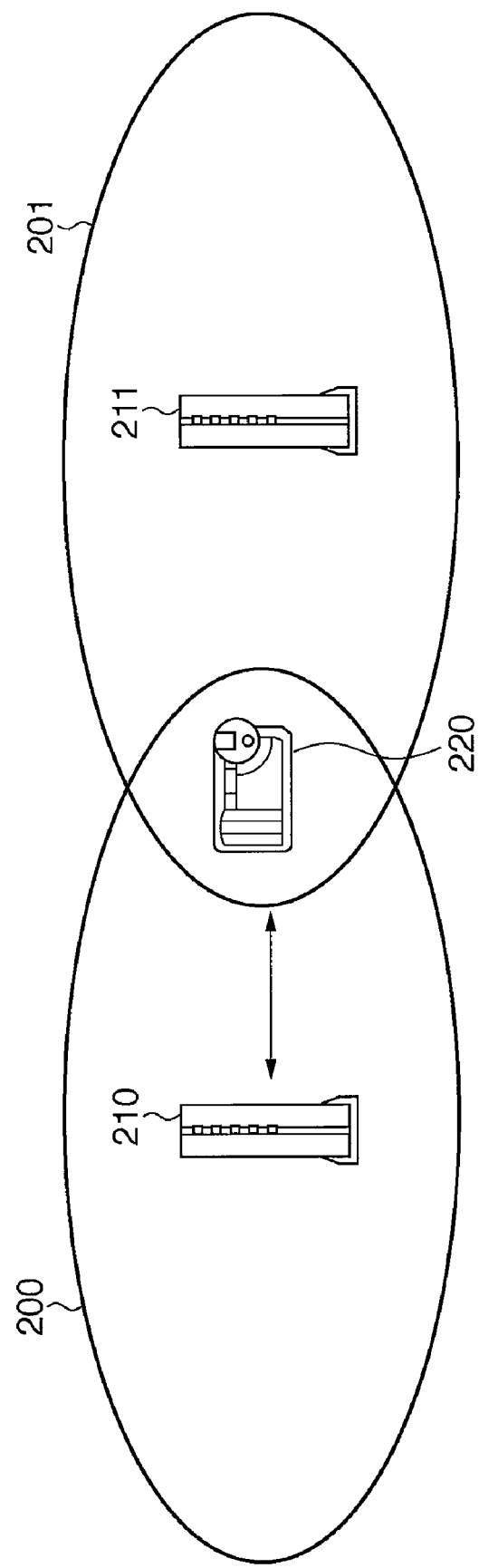
FIG. 4 is a diagram showing an exemplary configuration of a communication system made up of a plurality of communication apparatuses.

FIG. 4 is a diagram showing an exemplary configuration of a communication system made up of a plurality of communication apparatuses. In the example shown in FIG. 4, reference numeral 210 denotes a WUSB host serving as a host in a WUSB cluster 200. Reference numeral 220 denotes a WUSB device serving as a device. While the WUSB host 210 controls only one WUSB device 220 in FIG. 4, more than one WUSB device may exist as necessary.

Here, the communication system is implemented by the existence of two WUSB clusters each made up of a WUSB host and a WUSB device. That is, another MAC layer device 211 forms a beacon group 201, and the WUSB device 220 is located in the communication areas of the WUSB clusters 200 and 201.

Figure 5:
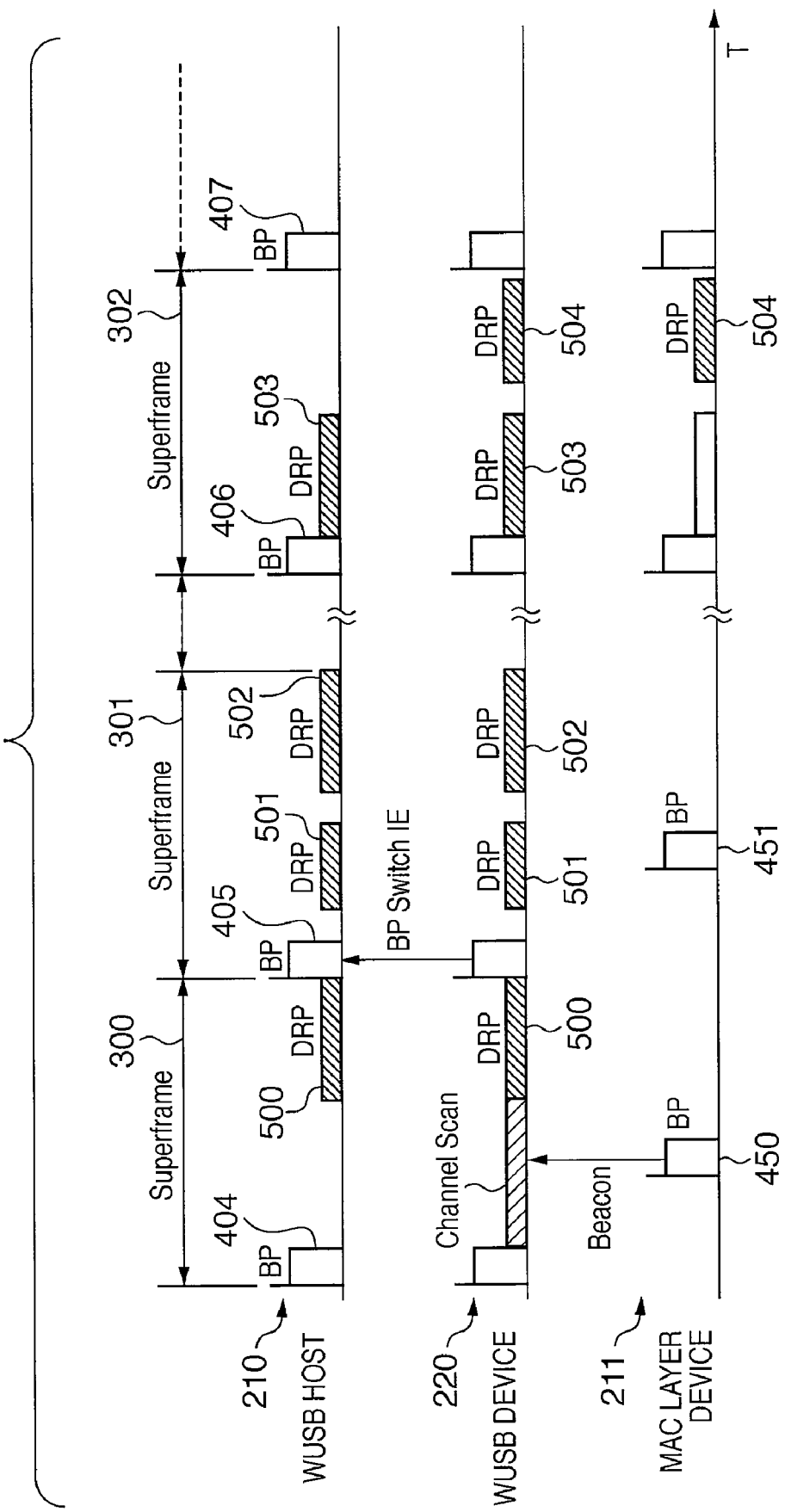
FIG. 5 is a diagram showing a timing chart in which superframe synchronization adjustment is performed between two WUSB clusters.

FIG. 5 is a diagram showing a timing chart in which the superframe synchronization adjustment is performed between the two WUSB clusters. It is assumed here that the WUSB device 220 shown in FIG. 4 is an SBD and the WUSB host 210 already forms the WUSB cluster 200 with the WUSB device 220. The WUSB host 210 performs the superframe synchronization adjustment with the MAC layer device 211 via the WUSB device 220.

In a superframe 300, in which the WUSB host 210 and the WUSB device 220 both transmit a beacon in their own beacon slot in a BP 404 and reserve a DRP 500, the WUSB device 220 performs channel scan. At this point, it is assumed that the WUSB device 220 receives a beacon transmitted by the MAC layer device 211 during the duration of the superframe 300. In a superframe 301, the WUSB device 220 inserts a BP Switch IE into a beacon in the BP 405 to notify the WUSB host 210 of the change of the BPST start point.

The WUSB device 220 further reserves the DRP 500 as a DRP used by the MAC layer device for which the superframe synchronization adjustment has not been performed. After a certain period, in a superframe 302, all devices within the WUSB cluster 200 moves the BPST to align it with the BPST of the MAC layer device 211. Thus, the superframe synchronization adjustment is completed.

Processing in the case where the BP is occupied when the communication apparatus starts up in the above-described basic communication system will be described with reference to FIGS. 6 to 9.

Figure 6:
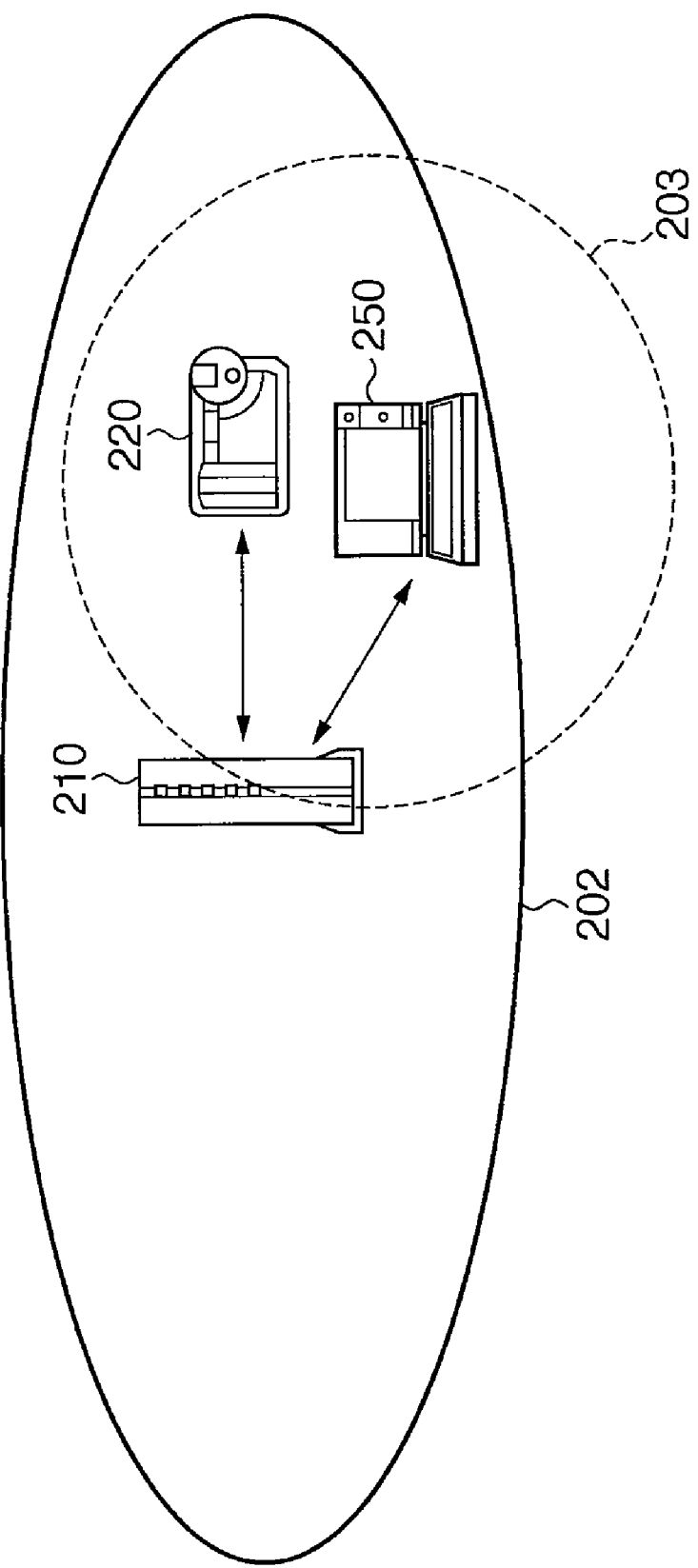
FIG. 6 is a diagram showing an exemplary configuration of the communication system in the first embodiment.

FIG. 6 is a diagram showing an exemplary configuration of the communication system in the first embodiment. Reference numeral 210 denotes a WUSB host serving as a host in a WUSB cluster 202. Reference numeral 220 denotes a WUSB device serving as a device. Reference numeral 250 denotes a MAC layer device that uses the WUSB sublayer MAC, and this device may be a WUSB device.

While the WUSB host controls only two WUSB devices in FIG. 6, more than two devices may exist. The WUSB device 220 is located in a communication area 203 of the MAC layer device 250.

Figure 7:
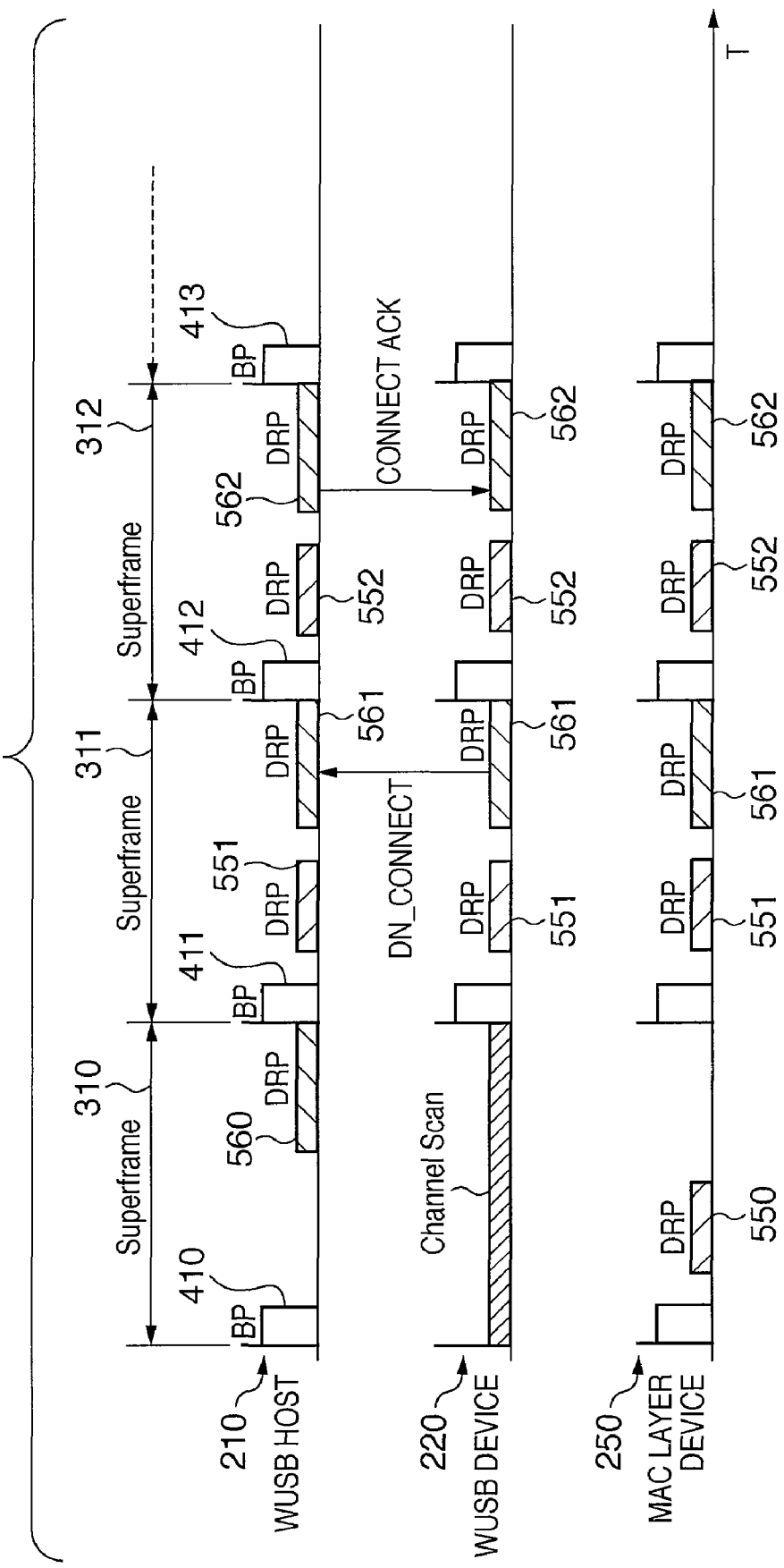
FIG. 7 is a diagram showing a timing chart at startup in the case where a WUSB device 220 shown in FIG. 6 is an SBD.

FIG. 7 is a diagram showing a timing chart at startup in the case where the WUSB device 220 shown in FIG. 6 is an SBD. In the figure, the abscissa denotes a time axis. The WUSB host 210 transmits a beacon in the BP 410 when forming the WUSB cluster 202. Similarly, the MAC layer device 250 and other devices (not shown) transmit a beacon in the BP 410. In this example, the WUSB host 210 sets a DRP 560 as a reserved band, and the MAC layer device 250 sets a DRP 550 as a reserved band.

Here, the WUSB device 220 is in reception mode in a superframe 310, so that it intercepts the beacons to analyze the BPST and beacon IEs, and detects the numbers of beacon slots in which it can transmit and the DRPs. The WUSB device 220 further detects MMCs of the WUSB host 210 to which it intends to connect.

The WUSB device 220 transmits a beacon in a BP 411 of a superframe 311 and transmits a DN_CONNECT: Device Notification Connect command in a DRP 561 reserved by the WUSB host 210. In a superframe 312, the WUSB device 220 continues transmitting a beacon.

On the other hand, the WUSB host 210 acknowledges the connection by inserting a Connect Ack IE into an MMC in a DRP 562, and the WUSB host 210 and the WUSB device 220 start processing necessary for data communication.

In FIG. 7, if the BP is occupied to the maximum length by devices around the WUSB device 220, the WUSB device 220 cannot transmit the beacon in the BP 411. Further, the WUSB device 220 cannot start up as an SBD and cannot connect to the WUSB host 210. Thus, there has been the following problem: while 48 beacon slots exist for a maximum BP length of 16 MASs for example, the WUSB device 220 cannot connect to the WUSB host 210 if none of these beacon slots are available.

Figure 8:
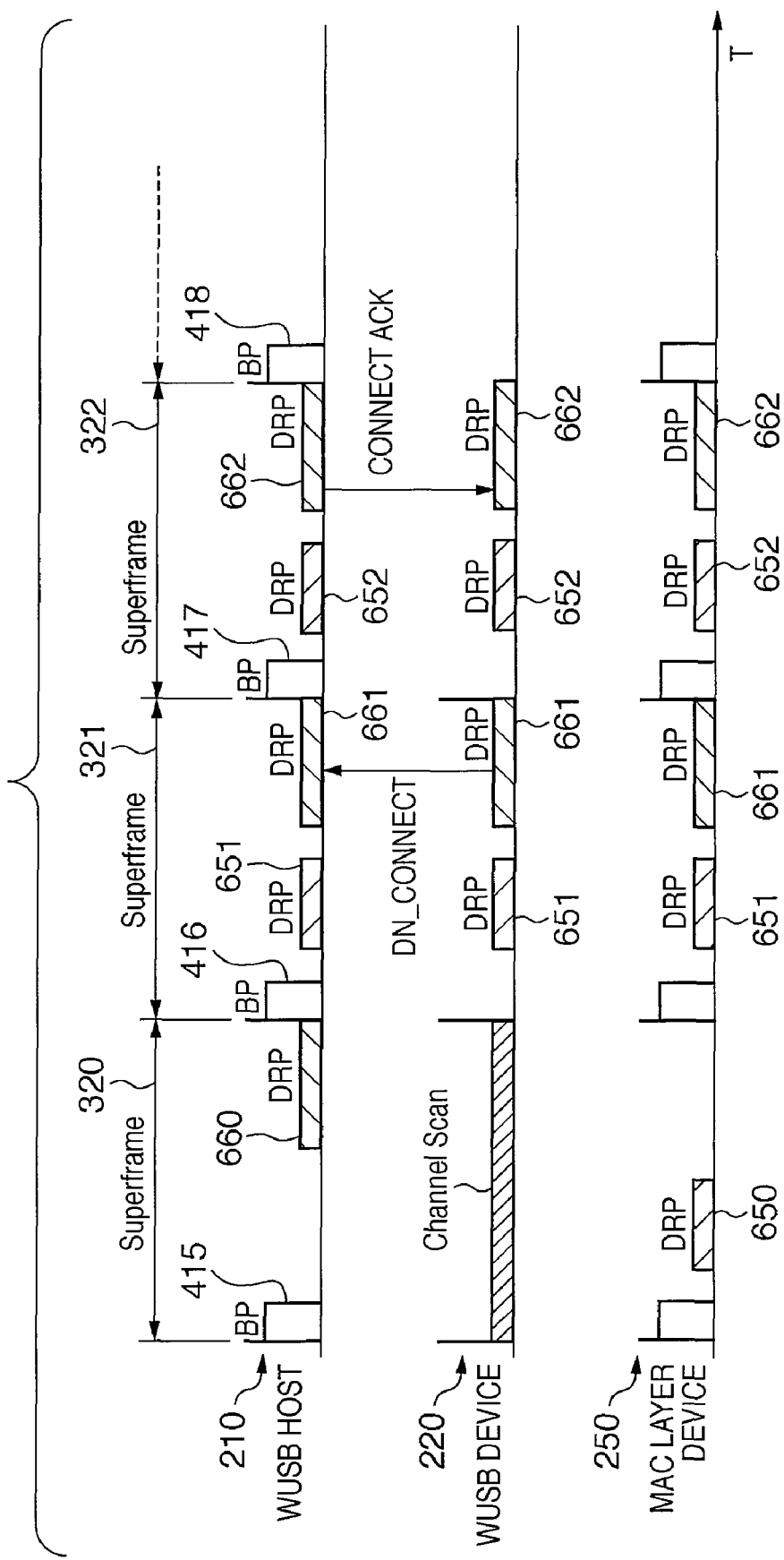
FIG. 8 is a diagram showing a timing chart in the case where the WUSB device 220 shown in FIG. 6 starts up as a WUSB device.

FIG. 8 is a diagram showing a timing chart in the case where the WUSB device 220 shown in FIG. 6 starts up as a WUSB device. In the figure, the abscissa denotes a time axis. The WUSB host 210 transmits a beacon in a BP 415 when forming the WUSB cluster 202. Similarly, the MAC layer device 250 and other devices (not shown) transmit a beacon in the BP 415. In this example, the WUSB host 210 sets a DRP 660 as a reserved band, and the MAC layer device 250 sets a DRP 650 as a reserved band.

Here, the WUSB device 220 is in reception mode in a superframe 320, so that it intercepts the beacons to analyze the BPST and beacon IEs, and detects the numbers of beacon slots in which it can transmit and the DRPs. The WUSB device 220 further detects MMCs of the WUSB host 210 to which it intends to connect.

Before the next superframe 321 starts, the WUSB device 220 determines whether the BP is used to the maximum length and the beacon slots are occupied. If it is determined that the beacon slots are occupied, the WUSB device 220 performs the following operations.

The WUSB device 220 does not transmit a beacon in a BP 416 of a superframe 321 but transmits DN_CONNECT: Device Notification Connect in a DRP 661 reserved by the WUSB host 210. The WUSB device 220 still does not transmit a beacon in a superframe 322.

On the other hand, the WUSB host 210 acknowledges the connection by inserting the Connect Ack IE into an MMC in a DRP 662, and the WUSB host 210 and the WUSB device 220 start processing necessary for data communication.

Figure 9:
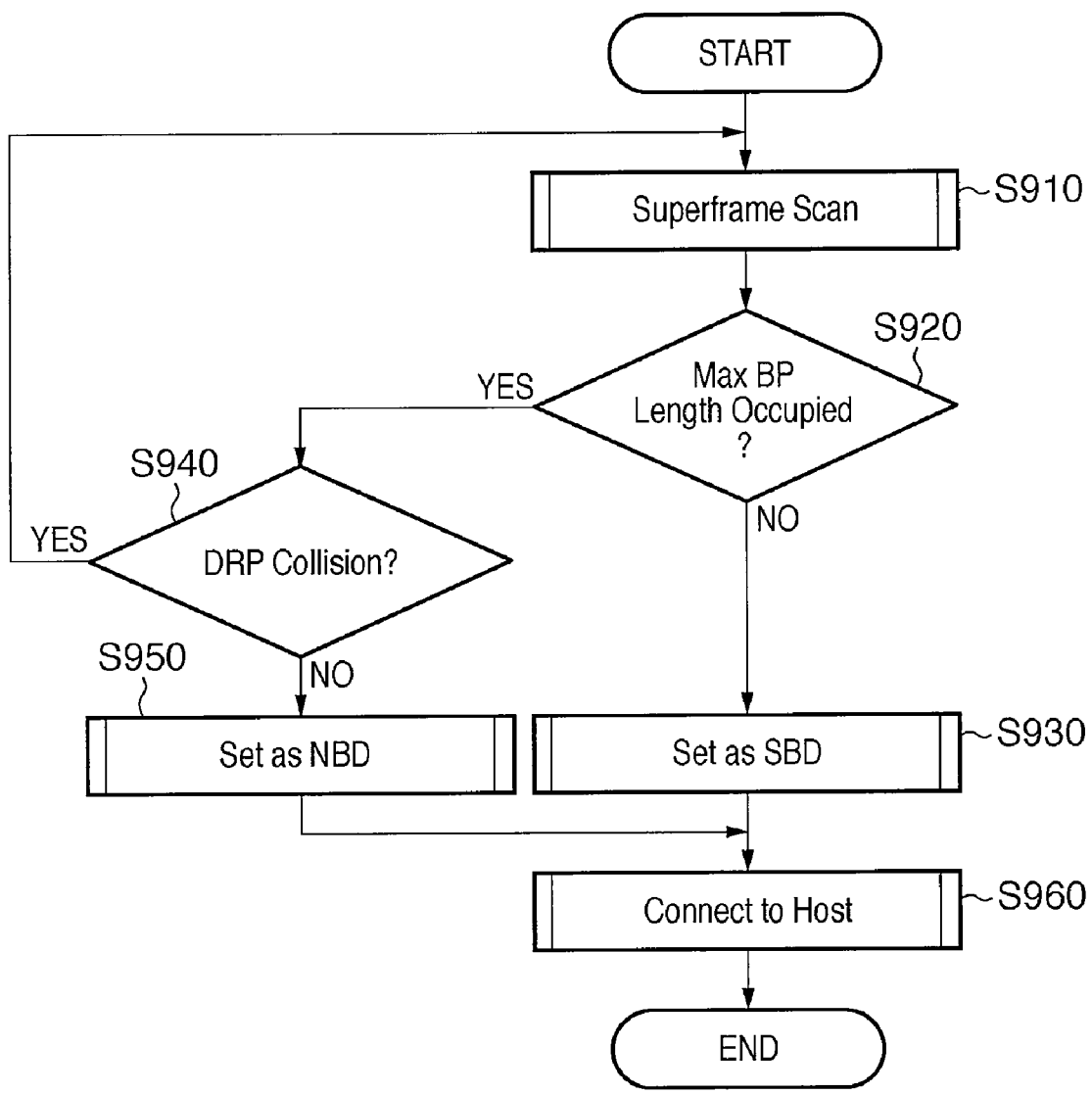
FIG. 9 is a flowchart showing operations of the WUSB device 220 in the first embodiment.

FIG. 9 is a flowchart showing operations of the WUSB device 220 in the first embodiment. This procedure is stored in the ROM 130 of the WUSB device 220, and read out and executed by the CPU 110 at startup.

First, in step S910, the WUSB device 220 scans the channel for the duration of at least one superframe and analyzes beacons transmitted by other devices. Next, in step S920, the WUSB device 220 determines whether or not the beacon slots are occupied to the maximum BP length. If the determination results in "No," the WUSB device 220 sets itself as an SBD (step S930).

If the determination in step S920 results in "Yes," the WUSB device 220 determines whether or not a collision occurs between the DRP of the WUSB host 210 to which it intends to connect and the DRP of another device (step S940). If the determination results in "Yes," the process returns to step S910 with no connection operation performed. If the determination in step S940 results in "No," the WUSB device 220 sets itself as an NBD (step S950). In step S960, the WUSB device 220 connects to the WUSB host 210 as a device set by itself.

Figure 10:
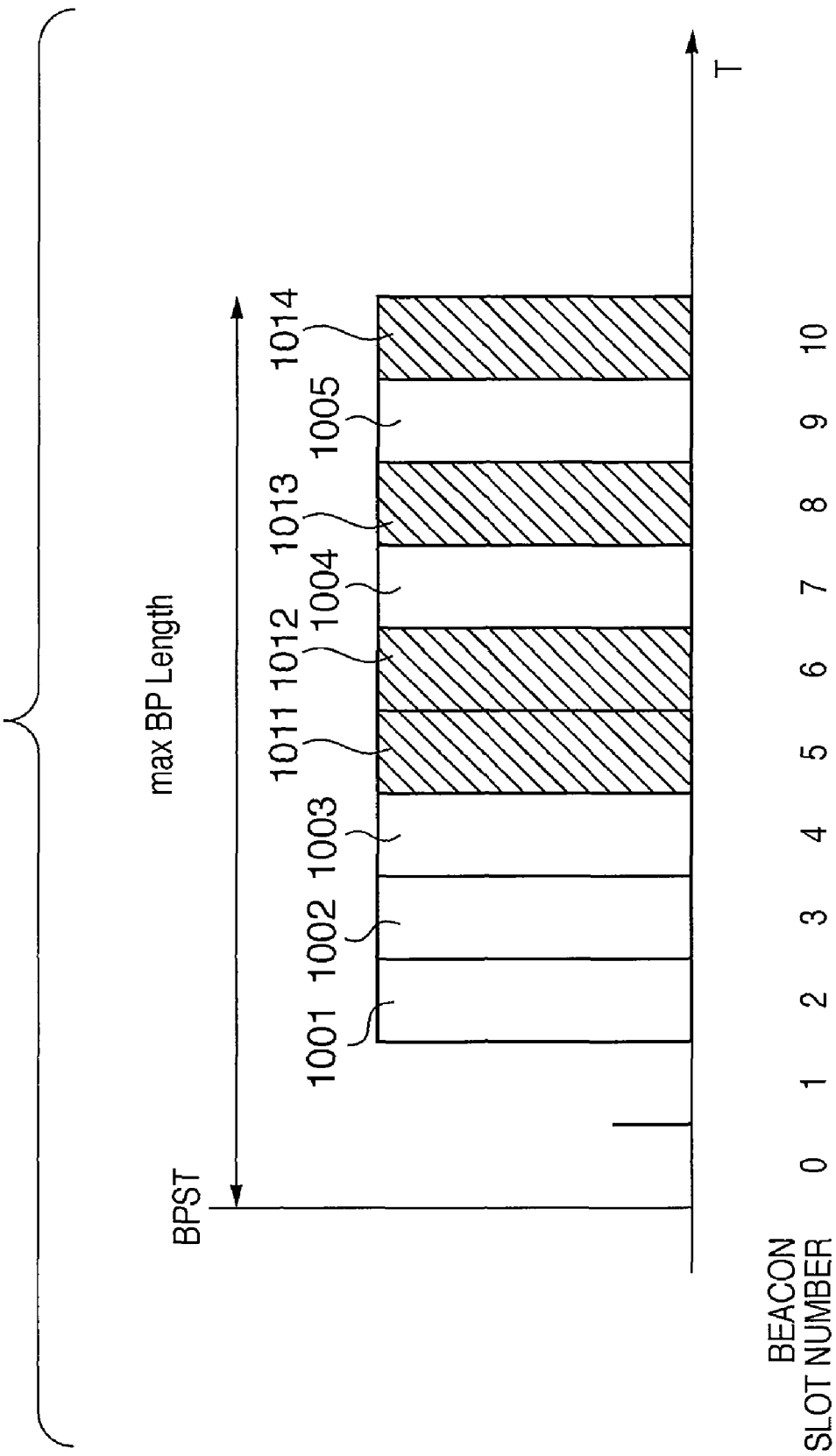
FIG. 10 is a diagram for describing processing of determining whether beacon slots are occupied to the maximum BP length in S920 shown in FIG. 9.

FIG. 10 is a diagram for describing the processing of determining whether the beacon slots are occupied to the maximum BP length in S920 shown in FIG. 9. For simplicity, it is assumed here that the maximum BP length is eleven beacon slots. The first two BP slots are regarded as occupied because they are used for extending the BP length.

Reference numerals 1001 to 1005 denote beacons that can be directly received by the device. Reference numerals 1011 to 1014 denote beacons that cannot be directly received but are declared to be occupied in the BPO IE of other beacon slots.

In the case as shown in FIG. 10, it is determined that the beacon slots are occupied to the maximum BP length. However, if any of the beacon slots are not declared to be occupied in the BPO IE, it is determined that an empty beacon slot exists.

Figure 11:
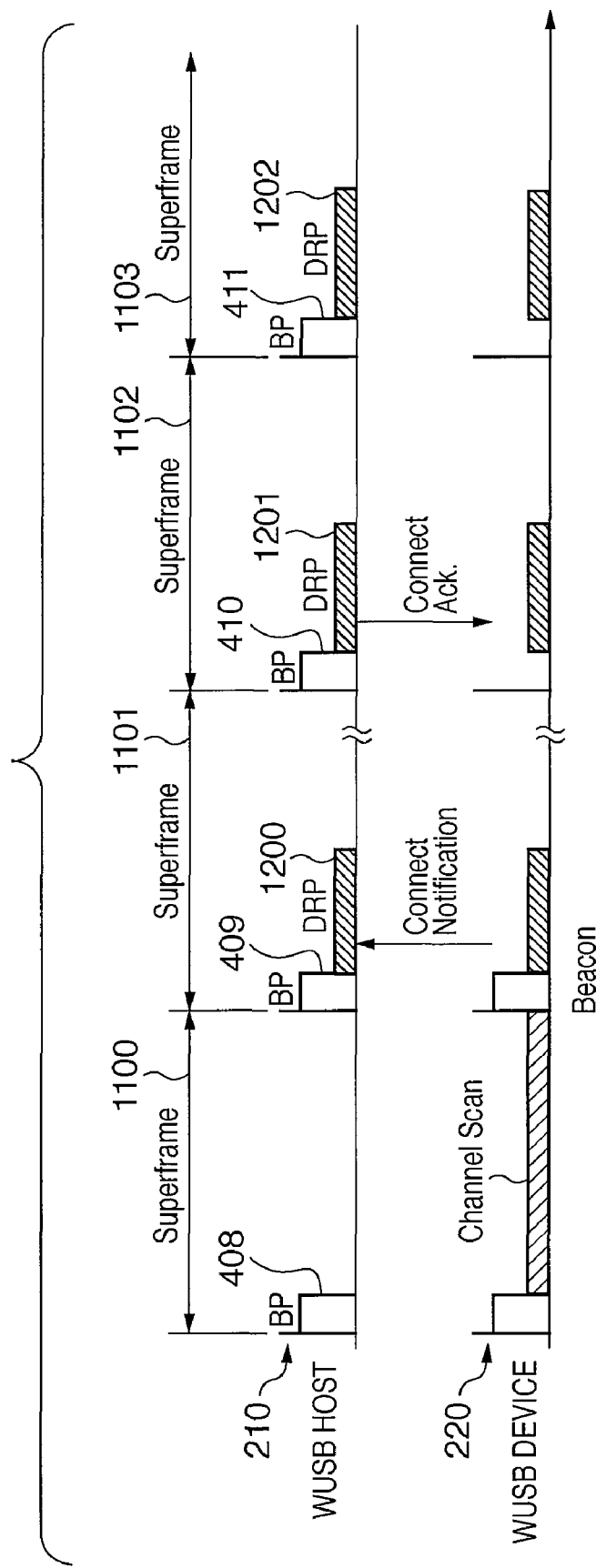
FIG. 11 is a diagram showing a timing chart in the case where the WUSB device in the first embodiment operates as an NBD.

FIG. 11 is a diagram showing a timing chart in the case where the WUSB device in the first embodiment operates as an NBD. In a superframe 1100, the WUSB device 220 performs channel scan. If the WUSB device 220 determines that the beacon period is occupied, it detects in a superframe 1101 a Device Notification timeslot described in an MMC in the DRP 1200. The WUSB device 220 transmits Connect Notification to the WUSB host 210 as an NBD.

On the other hand, the WUSB host 210 returns Connect Acknowledgement in an MMC in a DRP 1201, and the WUSB device 220 is connected as an NBD. From a superframe 1102 onward, during the BP period, the WUSB device 220 does not listen for beacons of other devices nor transmit a beacon by itself.

According to the first embodiment, if all the beacon slots are occupied when the WUSB device is going to connect to the WUSB host, the WUSB device starts up as an NBD. Therefore, the WUSB device can connect to the WUSB host.

In addition, the WUSB device is provided with the function of preventing connection to the WUSB host when a collision of reserved communication bands occurs between a device around the WUSB device and the WUSB host. Therefore, a communication failure can be avoided.

Second Embodiment

Now, a second embodiment according to the present invention will be described in detail with reference to the drawings. The configuration of the communication apparatus in the second embodiment will not be described because it is the same as that shown in FIG. 3 described in the first embodiment. Also, the configuration of the communication system in the second embodiment will not be described because it is the same as that shown in FIG. 6 described in the first embodiment.

Figure 12:
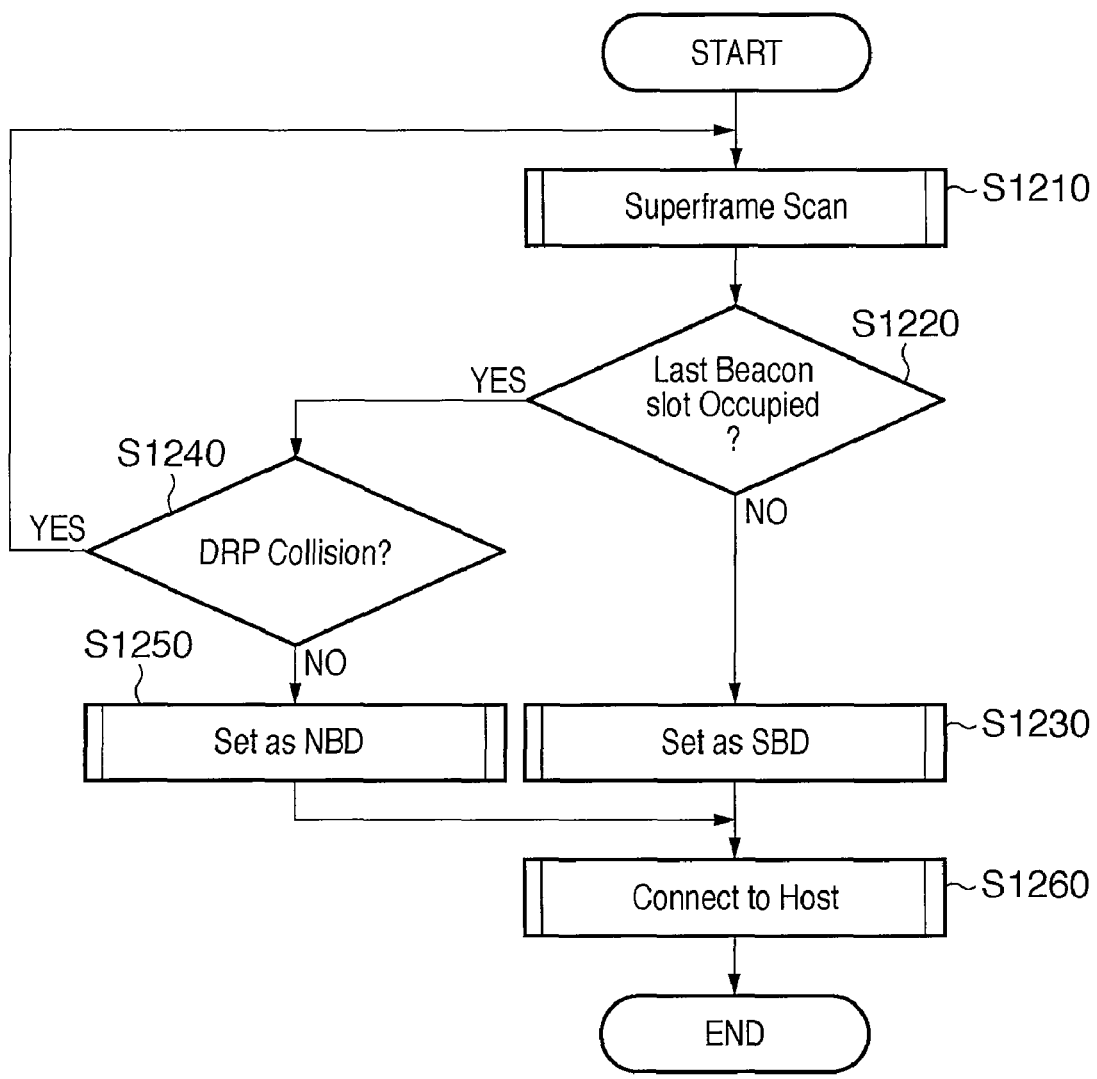
FIG. 12 is a flowchart showing operations of the WUSB device 220 in a second embodiment.

FIG. 12 is a flowchart showing operations of the WUSB device 220 in the second embodiment. This procedure is stored in the ROM 130 of the WUSB device 220, and read out and executed by the CPU 110 at startup.

First, in step S1210, the WUSB device 220 scans the channel for the duration of at least one superframe and analyzes beacons transmitted by other devices. Next, in step S1220, the WUSB device 220 determines whether or not the BP has the maximum length and the last beacon slot of the BP is occupied. If the determination results in "No," the WUSB device 220 sets itself as an SBD (step S1230).

If the determination in step S1220 results in "Yes," the WUSB device 220 determines whether or not a collision occurs between the DRP of the WUSB host to which it intends to connect and the DRP of another device (step S1240). If the determination results in "Yes," the process returns to step S1210 with no connection operation performed. If the determination in step S1240 results in "No," the WUSB device 220 sets itself as an NBD (step S1250). In step S1260, the WUSB device 220 connects to the WUSB host 210 as a device set by itself.

Figure 13:
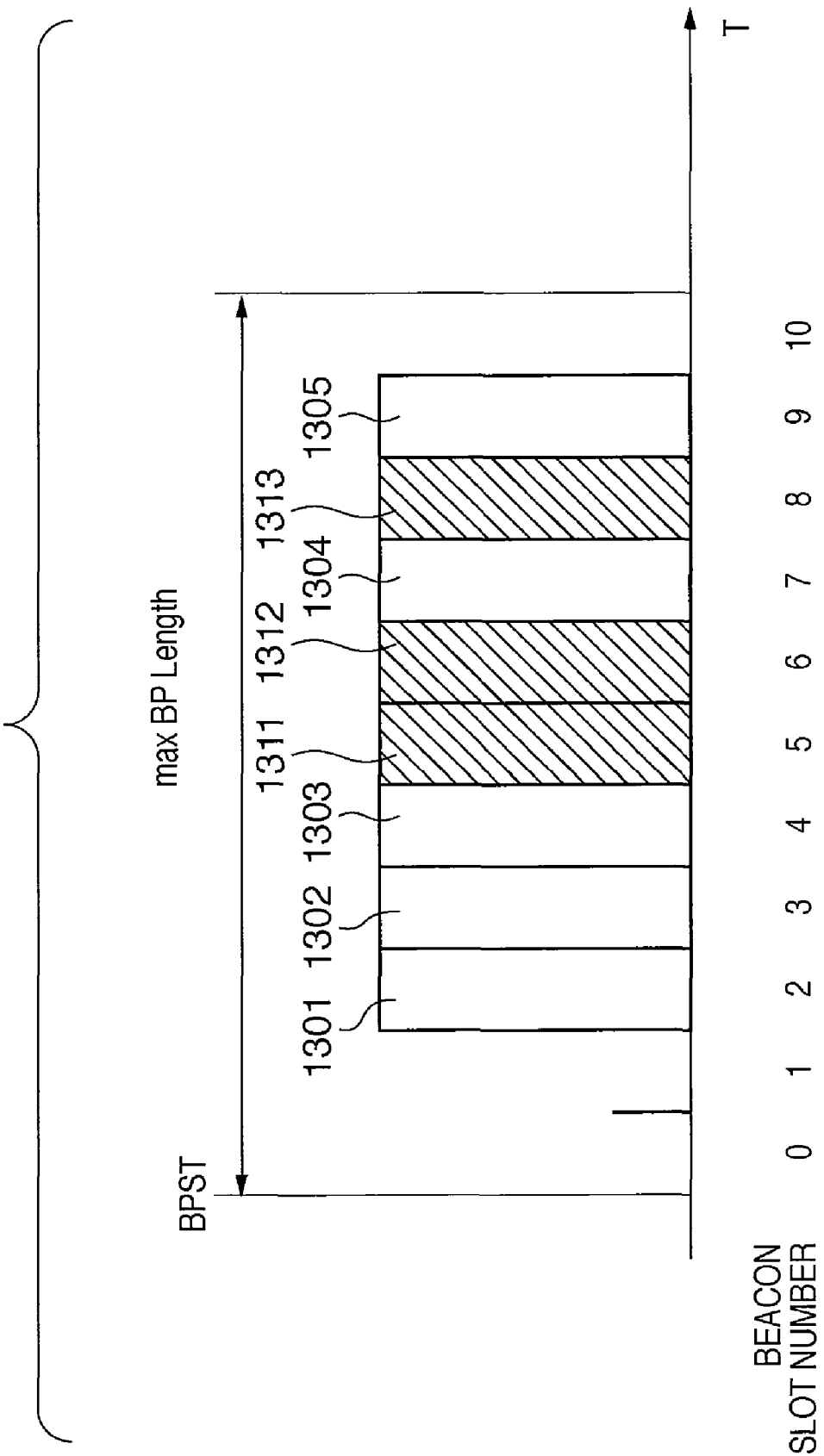
FIG. 13 is a diagram for describing processing of determining whether the BP has the maximum length and the last beacon slot is occupied in S1220 shown in FIG. 12.

FIG. 13 is a diagram for describing the processing of determining whether the BP has the maximum length and the last beacon slot is occupied in S1220 shown in FIG. 12. For simplicity, it is assumed here that the maximum BP length is eleven beacon slots. The first two BP slots are regarded as occupied because they are used for extending the BP length.

Reference numerals 1301 to 1305 denote beacons that can be directly received by the device. Reference numerals 1311 to 1313 denote beacons that cannot be directly received but are declared to be occupied in the BPO IE of other beacon slots. The bacon slot number 10 is the last slot of the BP, which is an empty slot in this case.

In the case as shown in FIG. 13, the device that is going to start up can transmit a beacon in this beacon slot.

However, when this slot is occupied, the beacon is to be transmitted after the beacon slots are relocated and this beacon slot becomes empty, because, even if any other beacon slots are empty, there is a possibility that other devices attempt to transmit a beacon.

According to the second embodiment, if the last beacon slot is occupied when the WUSB device is going to connect to the WUSB host, the WUSB device starts up as an NBD. Therefore, the WUSB device can connect to the WUSB host.

In addition, the WUSB device is provided with the function of preventing connection to the WUSB host when a collision of reserved communication bands occurs between a device around the WUSB device and the WUSB host. Therefore, a communication failure can be avoided.

Third Embodiment

Now, a third embodiment according to the present invention will be described in detail with reference to the drawings. The configuration of the communication apparatus in the third embodiment will not be described because it is the same as that shown in FIG. 3 described in the first embodiment. Also, the configuration of the communication system in the third embodiment will not be described because it is the same as that shown in FIG. 6 described in the first embodiment. The third embodiment corresponds to the first or second embodiment with operations added thereto.

Figure 14:
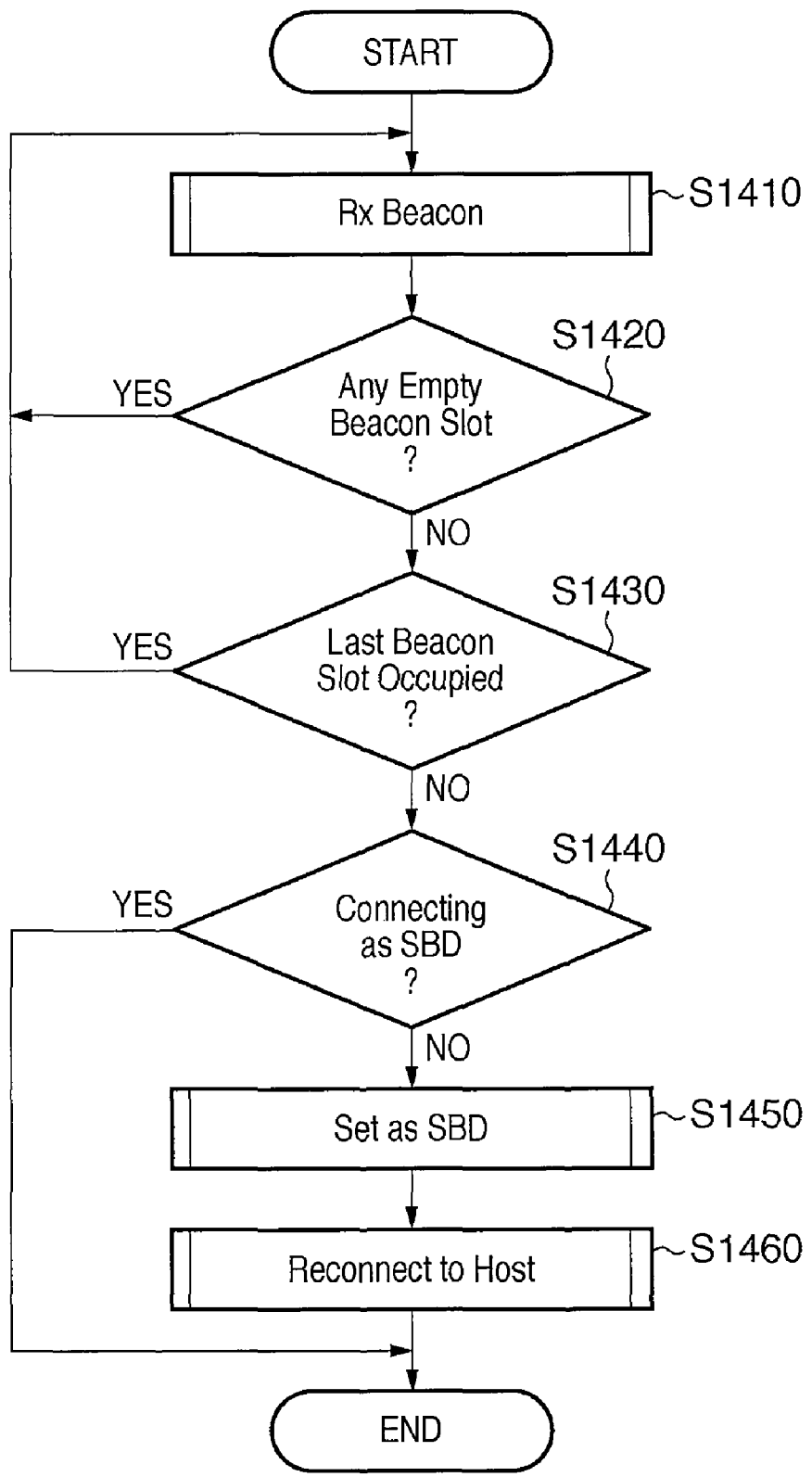
FIG. 14 is a flowchart showing operations of the WUSB device 220 in a third embodiment.

FIG. 14 is a flowchart showing operations of the WUSB device 220 in the third embodiment. This procedure is stored in the ROM 130 of the WUSB device 220, and read out and executed by the CPU 110 at startup.

After connecting to the WUSB host 210, the WUSB device 220 receives a beacon in step S1410 and analyzes DRPs and the state of occupancy of the beacon slots. In step S1420, the WUSB device 220 determines whether an empty beacon slot exists in the BP. If the determination results in "Yes," the process returns to step S1410. If the determination results in "No," the process proceeds to step S1430.

Here, if the device transmits a beacon in the empty slot based on only the determination result in step S1420, a collision may occur when another device changes the beacon slot. To avoid this problem, in the ECMA-368 standard, a device that is going to transmit a beacon will transmit a beacon after the last beacon slot of the BP.

That is, in step S1430, the WUSB device 220 determines whether or not a beacon can be transmitted based on determination whether the last beacon slot of the BP is occupied. If the determination results in "Yes," the process returns to step S1410. If the determination results in "No," the process proceeds to step S1440, where it is determined whether the WUSB device 220 is operating as an SBD. If the determination results in "Yes," the process terminates. However, if the determination results in "No," the WUSB device 220 sets itself as an SBD in step S1450. In step S1460, in order to inform that the WUSB device 220 can perform the superframe synchronization adjustment, the WUSB device 220 reconnects to the WUSB host 210 to notify that it has become an SBD.

Thus, as described above, depending on the state of occupancy of the beacon slots in the period for establishing the timing synchronization by transmitting and receiving beacons, the device operates (functions) by selectively switching between an SBD and an NBD, so that the device can efficiently connect to another communication apparatus. Specifically, even if the device usually functions as an SBD, the device is made to function as an NBD when the beacon slots are occupied. Therefore, the device can connect to another communication apparatus despite the inability to transmit a beacon.

The present invention may be applied to a system composed of a plurality of devices (for example, a host computer, an interfacing device, a reader, a printer, etc.), or to an apparatus implemented as a single device (for example, a copier, a facsimile device, etc.).

It is to be understood that the object of the present invention may be achieved in such a manner that a recording medium having recorded thereon a program code of software implementing the functions of the above-described embodiments is supplied to the system or apparatus, and a computer (a CPU or an MPU) of the system or apparatus reads out and executes the program code stored in the recording medium.

In this case, the program code itself read out from the computer-readable recording medium implements the functions of the above-described embodiments, so that the recording medium having stored thereon the program code constitutes the present invention.

The recording medium for supplying the program code may be a flexible disk, a hard disk, an optical disk, a magneto-optical disk, a CD-ROM, a CD-R, a magnetic tape, a nonvolatile memory card, or a ROM, for example.

It is to be understood that, besides the case where the computer executes the read-out program code to implement the functions of the above-described embodiments, the case is also included where an OS (operating system) or the like running on the computer performs part or all of actual processing under instructions of the program code to implement the functions of the above-described embodiments.

Further, it is to be understood that the case is also included where the program code read out from the recording medium is written to memory provided in a function extension board inserted into the computer or in a function extension unit connected to the computer, and then a CPU or the like provided in the function extension board or in the function extension unit performs part or all of actual processing under instructions of the program code to implement the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-260354, filed Oct. 3, 2007, which is hereby incorporated by reference herein in its entirety.

What is claimed is:

1. A communication apparatus comprising:
a synchronization unit that is synchronized with other communication apparatuses by transmitting and receiving a beacon to and from each other;
a determination unit that determines whether or not beacon slots for transmitting the beacon by said synchronization unit are occupied;
a connection unit that connects to another communication apparatus without transmitting the beacon depending on the determination of said determination unit; and
a setting unit that selectively sets the apparatus to function as a communication apparatus that is synchronized with other communication apparatuses by said synchronization unit, or to function as a communication apparatus that does not transmit a beacon,
wherein said setting unit sets the apparatus to function as a communication apparatus that is synchronized with other communication apparatuses if said determination unit determines that the beacon slots are not occupied.

2. The apparatus according to claim 1, wherein said determination unit analyzes a beacon transmitted by another communication apparatus to determine whether or not the beacon slots are occupied.

3. The apparatus according to claim 2, wherein said determination unit determines that the beacon slots are occupied if the analysis shows that all of the beacon slots are used.

4. The apparatus according to claim 2, wherein said determination unit determines that the beacon slots are occupied if the analysis shows that the last one of the beacon slots is used.

5. The apparatus according to claim 1, wherein the beacons are also used for band reservation.

6. A communication apparatus comprising:
a synchronization unit that is synchronized with other communication apparatuses by transmitting and receiving a beacon to and from each other;
a determination unit that determines whether or not beacon slots for transmitting the beacon by said synchronization unit are occupied; and
a connection unit that connects to another communication apparatus without transmitting the beacon depending on the determination of said determination unit,
wherein when the beacon slots are occupied, the connection is not performed if a collision occurs between a reserved band reserved by said other communication apparatus and a reserved band reserved by another communication apparatus different from said other communication apparatus.

7. A communication method for a communication apparatus that can be synchronized with other communication apparatuses by transmitting and receiving a beacon to and from each other, comprising:
determining whether or not beacon slots for transmitting the beacon are occupied;
connecting to another communication apparatus without transmitting the beacon depending on the determination; and
selectively setting the apparatus to function as a communication apparatus that is synchronized with other communication apparatuses by said synchronization unit, or to function as a communication apparatus that does not transmit a beacon,
wherein the setting step sets the apparatus to function as a communication apparatus that is synchronized with other communication apparatuses if it is determined in the determination step that the beacon slots are not occupied.

8. A non-transitory computer-readable recording medium having recorded a program for causing a computer to perform the communication method for a communication apparatus according to claim 7.

* * * * *